US010760675B1

(12) United States Patent
Grupido et al.

(10) Patent No.: US 10,760,675 B1
(45) Date of Patent: Sep. 1, 2020

(54) ASSEMBLY WITH GASKET CONFIGURED TO PARTLY FORM LUBRICANT DELIVERY CHANNEL

(71) Applicant: AMERICAN AXLE & MANUFACTURING, INC., Detroit, MI (US)

(72) Inventors: Salvatore N. Grupido, Rochester, MI (US); Aaron Leslie Minor, Howell, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 16/432,242

(22) Filed: Jun. 5, 2019

(51) Int. Cl.
| *F16H 57/04* | (2010.01) |
| *B60B 35/12* | (2006.01) |
| *B60B 35/16* | (2006.01) |
| *F16H 57/029* | (2012.01) |

(52) U.S. Cl.
CPC ....... *F16H 57/0423* (2013.01); *B60B 35/122* (2013.01); *B60B 35/16* (2013.01); *F16H 57/029* (2013.01); *F16H 57/045* (2013.01); *F16H 57/0457* (2013.01)

(58) Field of Classification Search
CPC .... F16H 57/029; F16H 57/04; F16H 57/0421; F16H 57/0423; F16H 57/045; F16H 57/0454; F16H 57/0457; F16H 57/0471; F16H 2057/02052; B60B 35/16; B60B 35/122
See application file for complete search history.

(56) References Cited

U.S. PATENT DOCUMENTS

| 2,842,006 A | * | 7/1958 | Edman | ...................... F16D 1/06 |
| | | | | 74/434 |
| 2,929,469 A | * | 3/1960 | Doan | .................... F16H 57/029 |
| | | | | 184/105.1 |
| 3,036,659 A | * | 5/1962 | Crowson | ................... F16N 7/26 |
| | | | | 184/11.1 |
| 3,303,721 A | * | 2/1967 | Puidokas | .............. F16H 57/037 |
| | | | | 74/607 |

(Continued)

FOREIGN PATENT DOCUMENTS

| DE | 102015217066 A1 | 2/2016 | |
| EP | 0067639 A2 * | 12/1982 | ........... B60B 35/163 |

(Continued)

*Primary Examiner* — Adam D Rogers
(74) *Attorney, Agent, or Firm* — Burris Law, PLLC

(57) ABSTRACT

A gear assembly includes gears, housing components joined to one another about the gears, and a gasket. Each housing component includes an axial end wall and a sidewall projecting axially from the axial end wall. The sidewall of each housing component has an axial end surface that faces the axial end surface of the other housing component. One of the housing components includes a rib that projects axially from the axial end wall thereof and is spaced inward from the sidewall thereof. The gasket includes a seal portion and a baffle portion. The seal portion is disposed between the axial end surfaces of the housing components to create a seal therebetween. The baffle portion extends inward from the seal portion and cooperates with the rib, the sidewall, and the axial end wall to form a channel configured guide drainage of lubricant thrown from at least one of the gears.

20 Claims, 18 Drawing Sheets

(56) References Cited

U.S. PATENT DOCUMENTS

| | | | | |
|---|---|---|---|---|
| 3,670,499 | A | * | 6/1972 | Tucholski ............ F16H 57/0447 |
| | | | | 60/464 |
| 3,854,553 | A | * | 12/1974 | Miller ..................... E02F 9/121 |
| | | | | 184/6.12 |
| 4,606,238 | A | | 8/1986 | Ikemoto et al. |
| 5,404,963 | A | * | 4/1995 | Crepas .................... F16C 17/04 |
| | | | | 184/6.12 |
| 5,622,077 | A | * | 4/1997 | Blanchet ................. B60S 1/166 |
| | | | | 15/250.3 |
| 5,984,048 | A | * | 11/1999 | Kiyosawa ............. F16H 49/001 |
| | | | | 184/6.12 |
| 7,044,098 | B2 | | 5/2006 | Amano et al. |
| 7,866,231 | B2 | | 1/2011 | Kincaid et al. |
| 7,938,095 | B2 | | 5/2011 | Jessberger et al. |
| 8,245,685 | B2 | | 8/2012 | Reinhart et al. |
| 9,625,029 | B2 | | 4/2017 | Vituri et al. |
| 9,752,673 | B2 | * | 9/2017 | Koga ................... F16H 57/0421 |
| 2008/0223349 | A1 | * | 9/2008 | Uenomaya .............. F02B 25/20 |
| | | | | 123/65 V |

FOREIGN PATENT DOCUMENTS

| | | | | | |
|---|---|---|---|---|---|
| JP | | 08210472 | A | * 8/1996 | .......... F16C 33/6674 |
| JP | | 2822004 | B2 | 11/1998 | |

\* cited by examiner

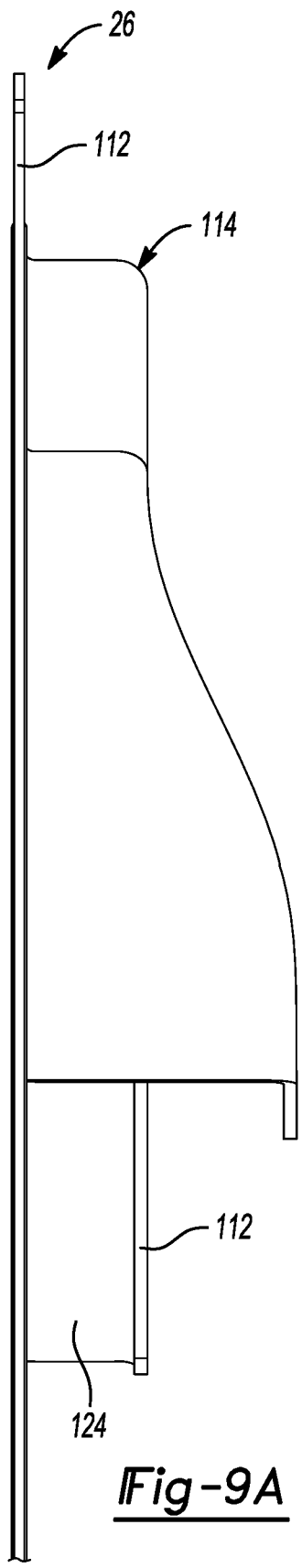
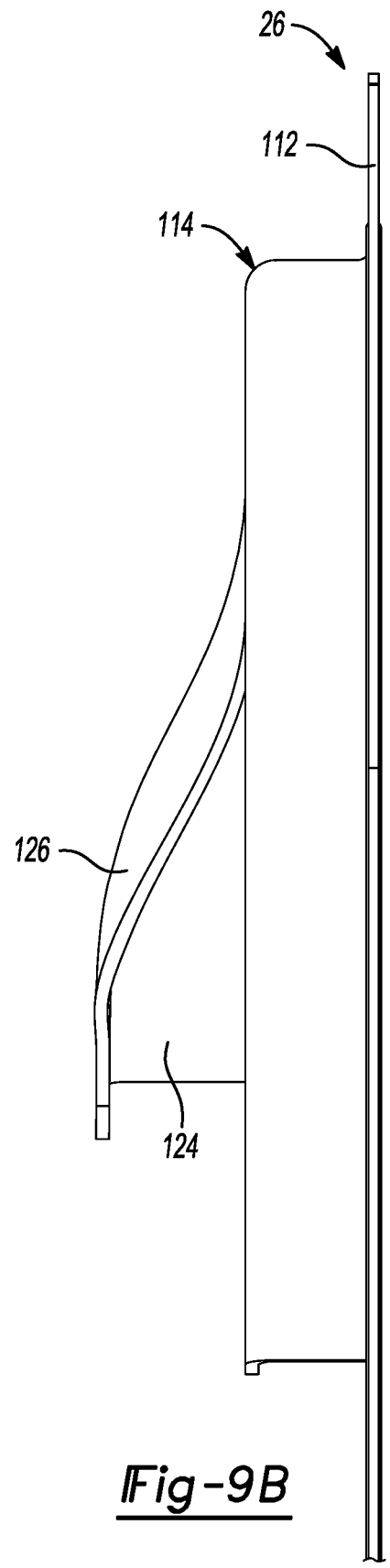
*Fig-9A*  *Fig-9B*

US 10,760,675 B1

ASSEMBLY WITH GASKET CONFIGURED TO PARTLY FORM LUBRICANT DELIVERY CHANNEL

FIELD

The present disclosure relates to assemblies with a gasket configured to partly form a lubricant delivery channel.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A gear assembly typically includes gears that mesh with one another, shafts to which the gears are fixed, bearings that support the shafts while allowing the shafts to rotate, and a gear housing that houses the gears, the bearings, and at least portions of the shafts. The gear housing is typically filled with a lubricant (e.g., oil) that is circulated throughout the gear assembly to lubricate components of the gear assembly such as the gears and the bearings. The lubricant is circulated from a lubricant sump formed by the gear housing, to the gears and the bearings, and returned to the lubricant sump. The gear housing is typically made up of at least two components that are joined together with a gasket therebetween that creates a seal between the two components.

An example of a gear assembly can be found in an electric axle. An electric axle typically includes an electric motor, one shaft that drives a wheel on one side of a vehicle, another shaft that drives a wheel on the other side the vehicle, and gears that couple the electric motor to the shafts. An electric axle also typically includes bearings that support the shafts while allowing the shafts to rotate, and an axle housing that encloses the electric motor and at least portions of the shafts. A lubricant is typically circulated throughout the electric axle to lubricate the gears and the bearings, and the axle housing is typically made up of at least two components that are joined together with a gasket therebetween.

SUMMARY

A gear assembly according to the present disclosure includes a plurality of gears, a gear housing, and a gasket. The gear housing includes a first housing component and a second housing component that are joined to one another about the plurality of gears to enclose the plurality of gears. Each of the first and second housing components includes an axial end wall and a sidewall projecting axially from a perimeter of the axial end wall. The sidewall of each of the first and second housing components has an axial end surface that faces the axial end surface of the other one of the first and second housing components. The first housing component including a rib that projects axially from the axial end wall of the first housing component and is spaced inward from the sidewall of the first housing component. The gasket includes a seal portion and a baffle portion. The seal portion is disposed between the axial end surface of the first housing component and the axial end surface of the second housing component to create a seal therebetween. The baffle portion extends inward from the seal portion and cooperates with the rib on the first housing component, the sidewall of the first housing component, and the axial end wall of the first housing component to form a channel. The channel is configured guide drainage of lubricant thrown from at least one of the plurality of gears.

In one example, the seal portion of the gasket and the baffle portion of the gasket are integrally formed as a single piece.

In one example, the channel extends along a portion of the perimeter of the gear housing without extending along the entire perimeter of the gear housing.

In one example, the channel has a first open end that receives the lubricant thrown from at least one of the plurality of gears and a second open end that discharges the lubricant.

In one example, all sides of the channel are fully closed such that lubricant flow into and out of the channel is only allowed through the first and second open ends.

In one example, the channel has a first cross-sectional area at the first open end and a second cross-sectional area at the second open end, the first cross-sectional area being greater than the second cross-sectional area.

In one example, the baffle portion of the gasket includes a sidewall and a flange, the sidewall of the baffle portion projecting axially from the seal portion of the gasket, the flange projecting inward from the sidewall of the baffle portion.

In one example, the rib on the first housing component forms an inner wall of the channel, and the sidewall of the first housing component and the sidewall of the gasket collectively form an outer wall of the channel.

In one example, the rib on the first housing component contacts the flange of the gasket along the entire length of the channel.

In one example, the sidewall of the baffle portion of the gasket projects axially from the seal portion of the gasket by a first amount at the first open end and projects axially from the seal portion of the gasket by a second amount at the second open end, the first amount being greater than the second amount.

In one example, the rib on the first housing component projects axially from the axial end wall of the first housing component by a first height at the first open end and projects axially from the axial end wall of the first housing component by a second height at the second open end, the first height being greater than the second height.

In one example, a first difference between the first and second heights of the rib is equal to a second difference between the first and second amounts by which the sidewall of the baffle portion of the gasket projects axially from the seal portion of the gasket.

In one example, the flange of the baffle portion of the gasket projects inward from the sidewall of the baffle portion by a first amount at the first open end and projects inward from the sidewall of the baffle portion by a second amount at the second open end, the first amount being greater than the second amount.

In one example, the rib on the first housing component is spaced inward from the sidewall of the first housing component by a first distance at the first open end and is spaced inward from the sidewall of the first housing component by a second distance at the second open end, the first distance being greater than the second distance.

In one example, a first difference between the first and second distances by which the rib is spaced inward from the sidewall of the first housing component is equal to a second difference between the first and second amounts by which the flange of the baffle portion of the gasket projects inward from the sidewall of the baffle portion.

An axle assembly according to the present disclosure includes a shaft, an axle housing, a bearing, and a gasket. The axle housing includes a first housing component and a second housing component. Each of the first and second housing components has an axial end surface and an inner radial surface that defines a shaft bore extending axially through a corresponding one of the first and second housing components. The first and second housing components are joined to one another such that the axial end surfaces of the first and second housing components face one another and the shaft bores of the first and second housing components are at least partially aligned with one another. The shaft extends through the shaft bores of the first and second housing components. The bearing is disposed in the shaft bore of the first housing component and supports the shaft while allowing the shaft to rotate. The gasket includes a seal portion and a dam portion. The seal portion is disposed between the axial end surfaces of the first and second housing components to create a seal therebetween. The dam portion extends radially inward from the seal portion to close off at least a portion of the shaft bore in the first housing component and thereby create a lubricant reservoir in a vicinity of the bearing.

In one example, the seal portion of the gasket and the dam portion of the gasket are integrally formed as a single piece.

In one example, the bearing has a first side facing the second housing component and a second side opposite of the first side, and the axle assembly further comprises an annular seal disposed in the shaft bore of the first housing component on the second side of the bearing and creating a seal between the shaft and the inner radial surface of the first housing component.

In one example, the lubricant reservoir is disposed between the dam portion of the gasket, the annular seal, the shaft, and the inner radial surface of the first housing component.

In one example, the gasket has a first side facing the first housing component and a second side opposite of the first side and facing the second housing component, the second side of the gasket abutting the axial end face of the second housing component along the seal portion of the gasket and the dam portion of the gasket.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 9A and 9B are bottom and top views of the gasket in the electric axle of FIG. 1;

In the drawings, reference numbers may be reused to identify similar and/or identical elements.

DETAILED DESCRIPTION

Figure 1:
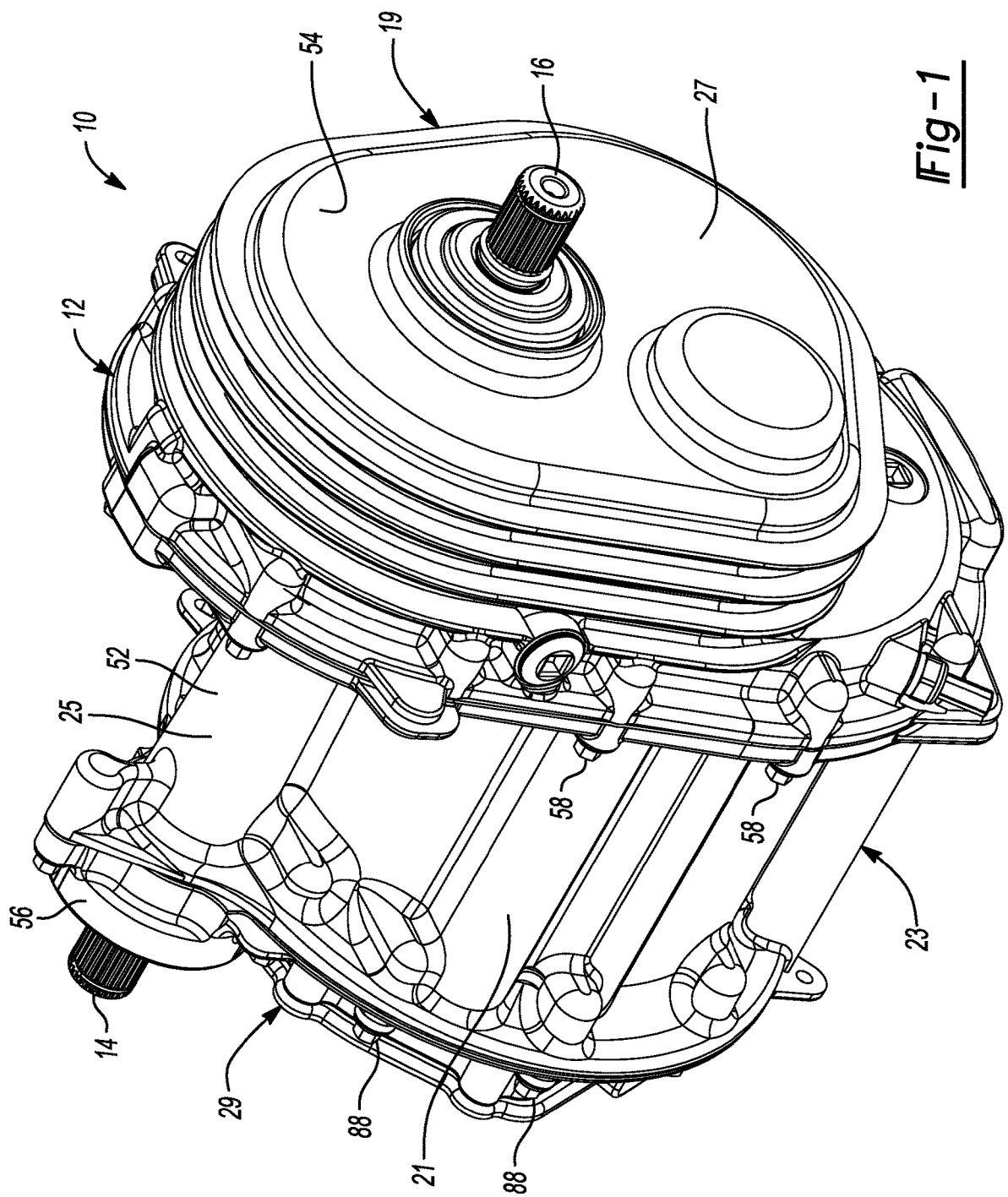
FIG. 1 is a perspective view of an example electric axle according to the present disclosure.
Figure 2:
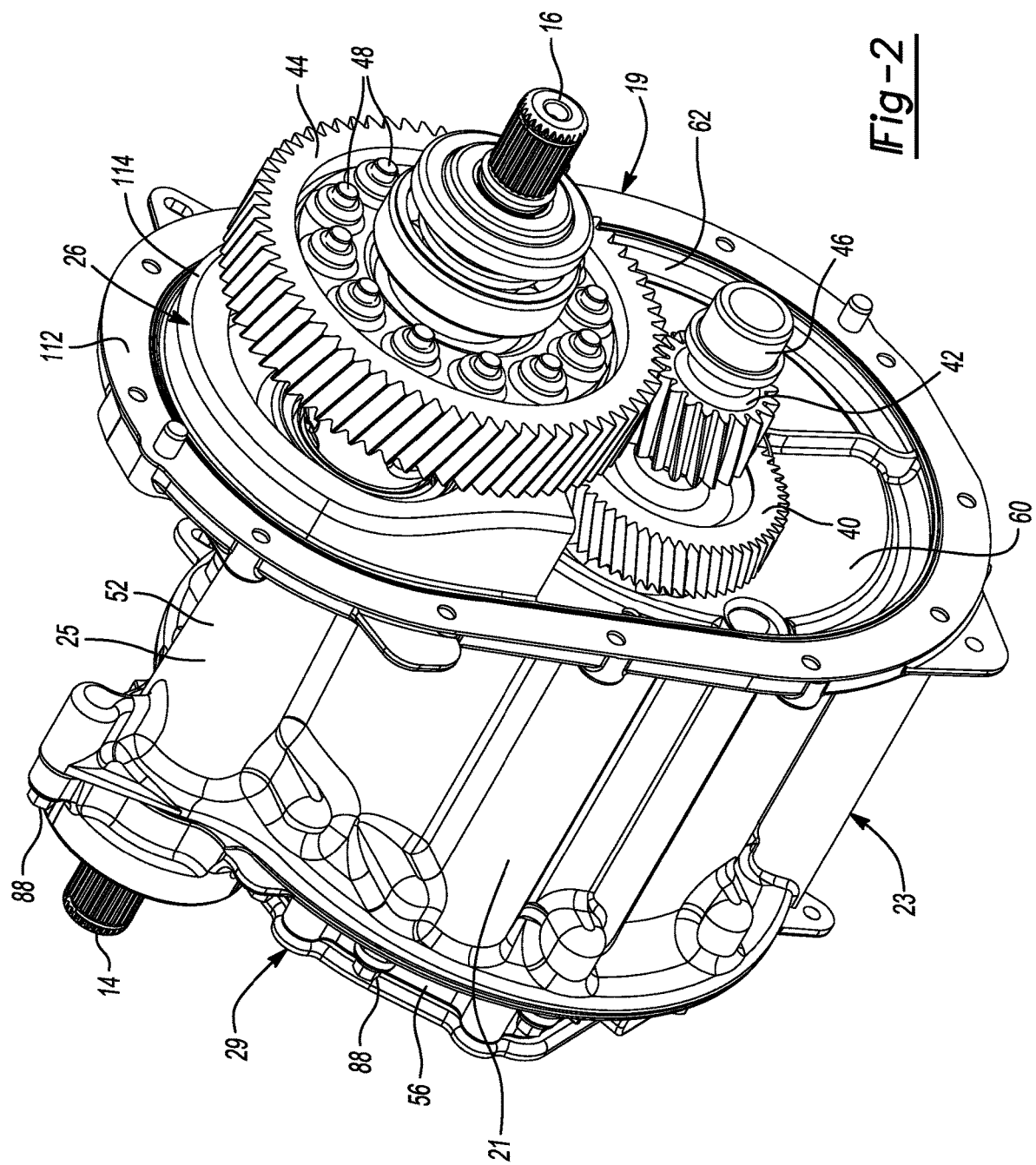
FIG. 2 is a perspective view of the electric axle of FIG. 1 with a cover of the electric axle removed.
Figure 3:
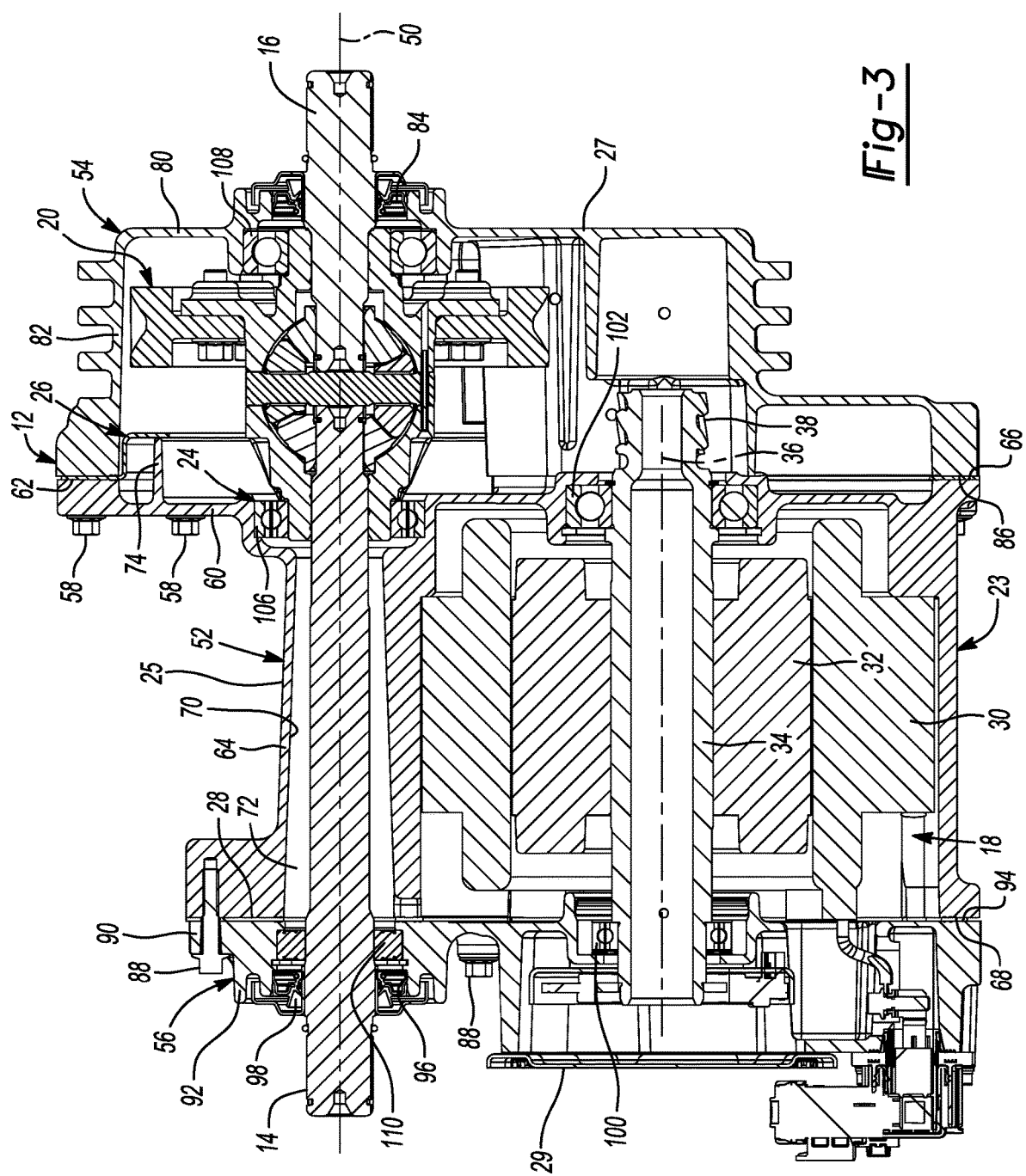
FIG. 3 is a section view of the electric axle of FIG. 1.
Figure 4:
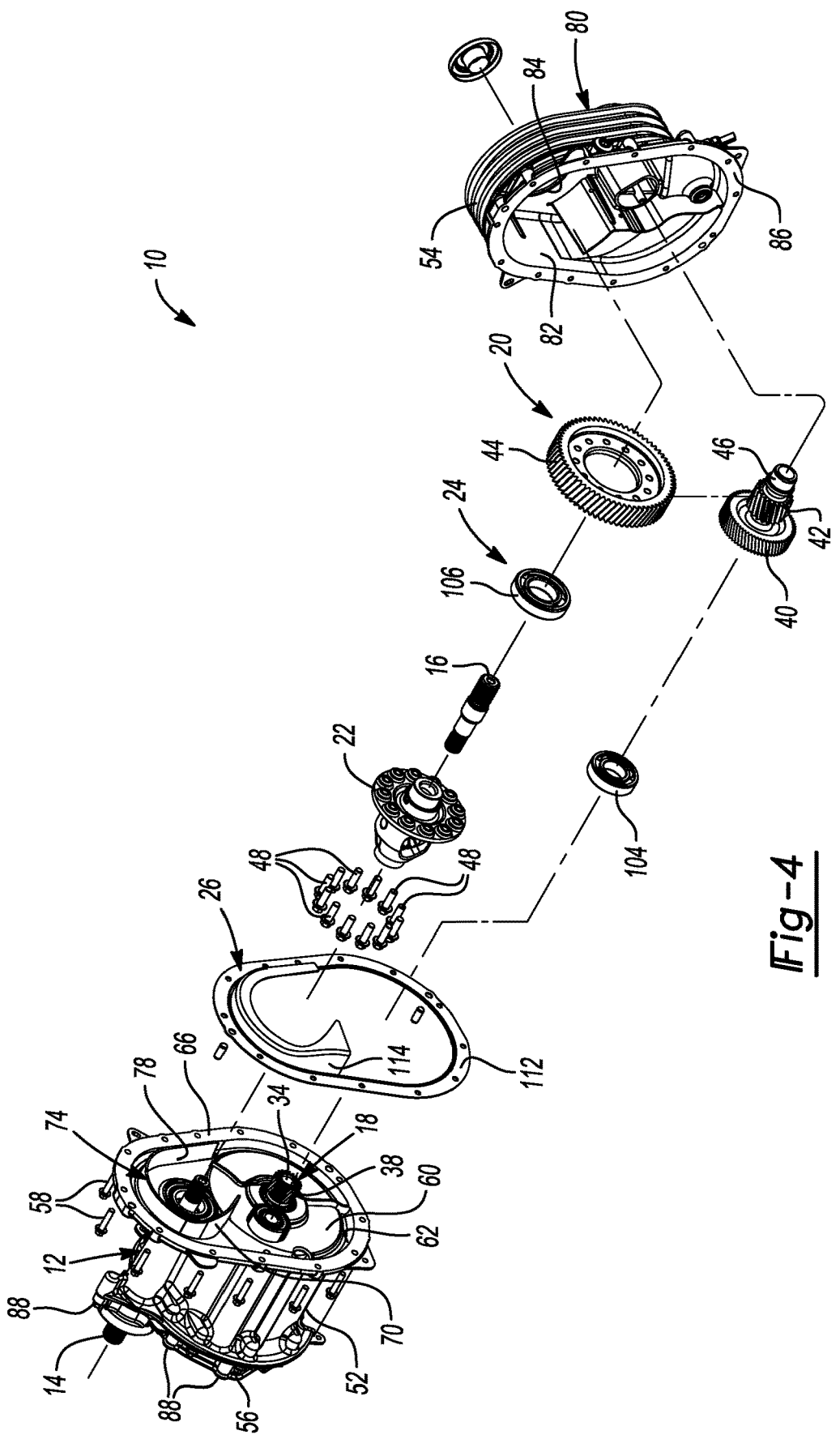
FIG. 4 is an exploded perspective view of the electric axle of FIG. 1.
Figure 5:
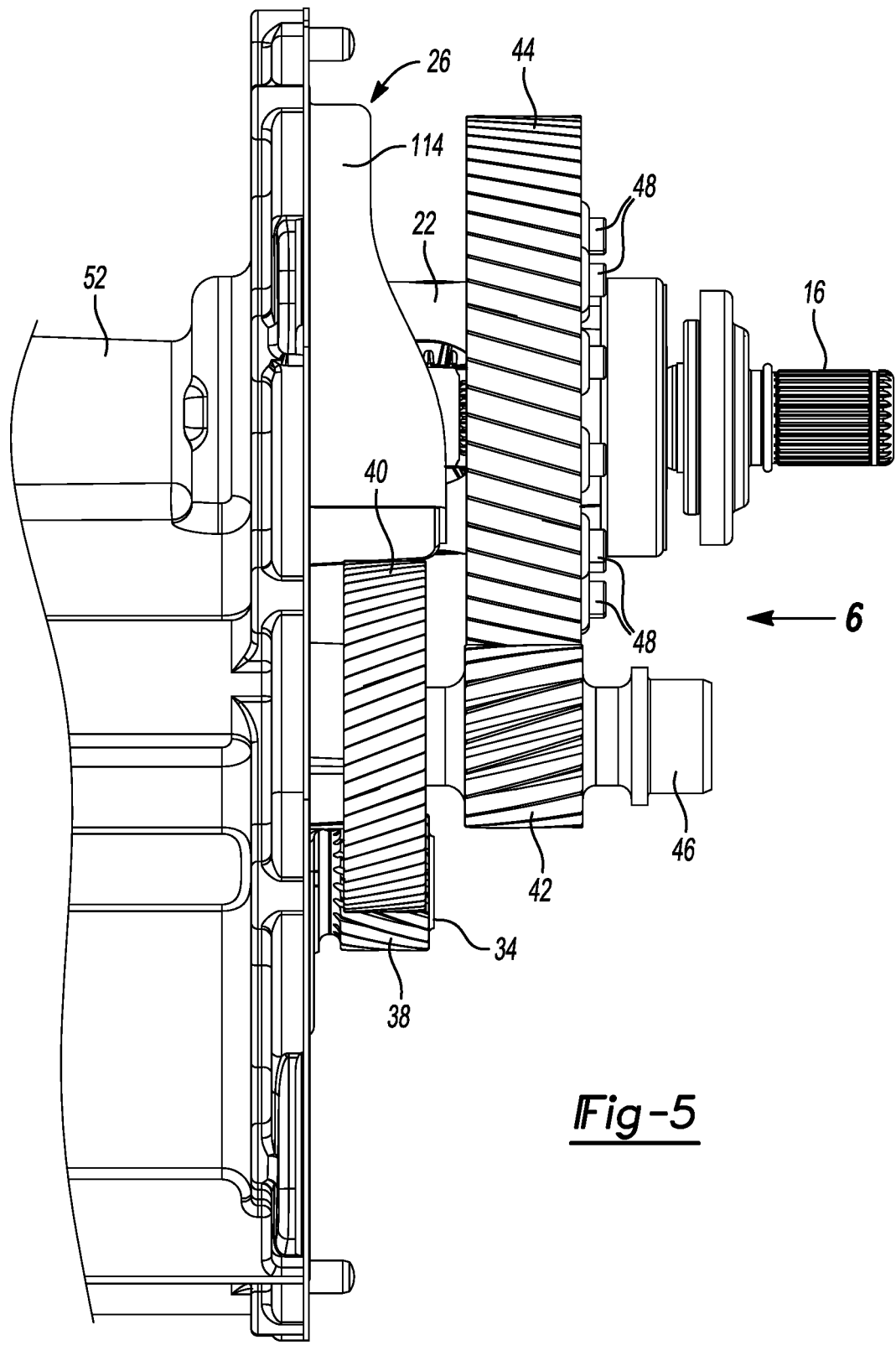
FIG. 5 is a bottom view of a portion of the electric axle of FIG. 1 with the cover of the electric axle removed.

In some gear assemblies, lubricant tends to accumulate in an area where gears mesh with one another instead of flowing to the lubricant sump for distribution to other areas of the gear assemblies. One approach to addressing this issue is to form a lubricant guide channel that directs the lubricant from the gear mesh area to the lubricant sump. The sidewalls and bottom wall of the lubricant guide channel may be formed by the gear housing, and the top wall of the lubricant guide channel may be formed by a baffle that is formed separate from the gear housing and attached thereto.

The cost of the baffle adds to the cost of the gear assembly. In addition, assembling the baffle to the gear housing increases the cost and complexity of assembling the gear assembly. Further, forming the walls of the lubricant guide channel in the gear housing adds to the cost and complexity of manufacturing the gear housing.

To address these issues, a gear assembly according to the present disclosure integrates the baffle into the gasket that is disposed between the components of the gear housing. In addition, since the gasket is typically disposed around the perimeter walls of the housing components, one of the perimeter walls are used as one of the walls for the lubricant guide channel. Thus, the design of the gear housing need only be modified to form one sidewall of the lubricant guide channel instead of two sidewalls. Therefore, the design of the lubricant guide channel reduces the cost and complexity of manufacturing the gear assembly.

In some electric axles, an axle housing defines an axle bore through which a shaft extends, a bearing is disposed in the axle bore to support the shaft, and an annular seal is disposed between the shaft and the axle housing and outboard of the bearing. Lubricant flows from a lubricant sump to an area in the axle bore around the bearing, and the annular seal prevents lubricant in that area from flowing out of the axle housing. However, lubricant may only flow to the area around the bearing when the vehicle propelled by the electric axle is travelling at high speeds (e.g., speeds greater than 20 miles per hour). Thus, the bearing may not be lubricated sufficiently at low speeds.

One approach to addressing this issue is to form a dam in the axle bore adjacent to the bearing to create a lubricant reservoir in the area around the bearing. For example, a first component of the axle housing may include a dam feature that projects into the axle bore of a second component of the axle housing to create the lubricant reservoir. The dam feature may be casted into the first housing component.

Casting the dam feature into the first housing component increases the cost and complexity of manufacturing the first housing component. In addition, casting the dam feature into the first housing component may be not be possible due to constraints associated with shapes that may be formed using casting processes. Further, forming the lubricant reservoir using a dam feature that is casted into one of the housing components may yield less lubricant volume than desired.

To address these issues, an electric axle according to the present disclosure includes a gasket between components of the axle housing that forms a dam to create a lubricant reservoir in the area around the bearing. In one example, the gasket includes an annular seal portion extending around the axle bore, and a semicircular or crescent-shaped dam portion projecting into the axle bore. The lubricant reservoir provides lubricant to the bearing at low speeds and when the vehicle is parked. Forming the dam using the gasket may be more feasible and less expensive than forming the dam using one of the housing components, and yield higher lubricant volumes.

Referring now to FIGS. 1-5, an electric axle 10 includes an axle housing 12, a first shaft 14, a second shaft 16, an electric motor 18, a plurality of gears 20, a differential 22, a plurality of bearings 24, a first gasket 26, and a second gasket 28. Each of the first and second shafts 14 and 16 are configured to be coupled to a driveshaft or half shaft that drives a wheel of a vehicle. For example, the first shaft 14 may be coupled to a left half shaft that drives a left front wheel of a vehicle, and the second shaft 16 may be coupled to a right half shaft that drives a right front wheel of the vehicle. The electric axle 10 has a first side 19, a second side 21, a third side 23, a fourth side 25, a fifth side 27, and a sixth side 29. When the electric axle 10 is installed in the vehicle, the electric axle 10 may be oriented so that the first side 19 is the top of the electric axle 10, the second side 21 is the bottom of the electric axle 10, the third side 23 is the front of the electric axle 10, the fourth side 25 is the rear of the electric axle 10, the fifth side 27 is the left side of the electric axle 10, and the sixth side 29 is the right side of the electric axle 10.

The electric motor 18 is configured to rotate the first and second shafts 14 and 16 and thereby propel the vehicle. The electric motor 18 includes a stator 30, a rotor 32, and a rotor shaft 34. The stator 30 includes windings that use electricity to generate a magnetic field, which causes the rotor 32 to rotate about a rotational axis 36. The rotor shaft 34 is fixed (e.g., splined) to the rotor 32 so that the rotor shaft 34 rotates with the rotor 32. The rotor shaft 34 has gear teeth 38 disposed at one end thereof.

The gears 20 and the differential 22 couple the rotor shaft 36 of the electric motor 18 to the first and second shafts 14 and 16. The gears 20 include a first gear 40, a second gear 42, and a third gear 44. The first and second gears 40 and 42 are fixed (e.g., splined) to a gear shaft 46 so that the second gear 42 rotates with the first gear 40. The first gear 40 engages the gear teeth 38 on the rotor shaft 36 so that rotation of the rotor shaft 36 causes rotation of the first and second gears 40 and 42. The third gear 44 engages the second gear 42 so that rotation of the second gear 42 causes rotation of the third gear 44.

The differential 22 is fixed to the third gear 44 so that the differential 22 rotates with the third gear 44. In the example shown, the differential 22 is fixed to the third gear 44 using fasteners 48. The first and second shafts 14 and 16 are fixed (e.g., splined, fastened) to the differential 22 so that the first and second shafts 14 and 16 rotate with the differential 22. The first shaft 14, the second shaft 16, and the differential 22 rotate about a rotational axis 50.

The axle housing 12 includes a first housing component 52, a second housing component 54, and a third housing component 56. The first and second housing components 52 and 54 are joined together about the gears 20 to enclose the gears 20. In the example shown, the first and second housing components 52 and 54 are joined together using fasteners 58. Each of the first and third housing components 52 and 56 may be referred to as a cover, and the first and second housing components 52 and 54 may be referred to collectively as a gear housing.

The first housing component 52 includes an axial end wall 60, a first sidewall 62 projecting axially from the outer perimeter of the axial end wall 60 in a first direction, and a second sidewall 64 projecting axially from the inner perimeter of the axial end wall 60 in a second direction. The second direction is opposite of the first direction. The first sidewall 62 of the first housing component 52 has an axial end surface 66. The second sidewall 64 of the first housing component 52 has an axial end surface 68 and an inner radial surface 70. The inner radial surface 70 of the second sidewall 64 defines a shaft bore 70 extending axially through the first housing component 52.

The first housing component 52 further includes a rib 74 projecting axially in the first direction from the axial end wall 60 of the first housing component 12. The rib 74 is spaced inward from the first sidewall 62 of the first housing component 12. The rib 74 includes a first section 76 that is not parallel with the first sidewall 62 of the first housing component 12 and a second section 78 that is parallel with the first sidewall 62.

The second housing component 54 includes an axial end wall 80 and a sidewall 82 that projects axially from the outer perimeter of the axial end wall 80 in the second direction. The axial end wall 80 of the second housing component 54 defines a shaft bore 84 that extends through the axial end wall 80. The sidewall 82 of the second housing component 54 has an axial end surface 86 that faces the axial end surface 66 of the first housing component 52.

The first and third housing components 52 and 56 are joined together about the electric motor 18 and the first shaft 14 to enclose the same. In the example shown, the first and third housing components 52 and 56 are joined together using fasteners 88. The third housing component 56 includes an axial end wall 90 and a sidewall 92 that projects axially from the inner perimeter of the axial end wall 90 in the second direction. The axial end wall 90 of the third housing component 56 has an axial end surface 94 that faces the axial end surface 68 of the first housing component 52. The sidewall 92 of the third housing component 56 has an inner radial surface 96 that defines a shaft bore 98 extending axially through the third housing component 56.

The shaft bore 72 in the first housing component 52, the shaft bore 84 in the second housing component 54, and the shaft bore 98 in the third housing component 56 are at least partially aligned with one another. The first shaft 14 extends through the shaft bores 72, 98 in the first and third housing components 52 and 56. The differential 22 extends through the shaft bores 72, 84 in the first and second housing components 52 and 54. The second shaft 16 extends through the shaft bore 84 in the second housing component 54.

The bearings 24 include a first rotor shaft bearing 100, a second rotor shaft bearing 102, a gear shaft bearing 104, a first coupler bearing 106, a second coupler bearing 108, and an axle shaft bearing 110. The first and second rotor shaft bearings 100 and 102 support the rotor shaft 34 while allowing the rotor shaft 34 to rotate about the rotational axis 36. The gear shaft bearing 104 supports the gear shaft 46 while allowing the gear shaft 46 to rotate. The first and second coupler bearings 106 and 108 support the differential 22 while allowing the differential 22 to rotate about the rotational axis 50.

The axle shaft bearing 110 supports the first shaft 14 while allowing the first shaft 14 to rotate about the rotational axis 50. While no bearing may be used to support the second shaft 16, the axle shaft bearing 110 may be used to support the first shaft 14 since the first shaft 14 is significantly longer than the second shaft 16. The first shaft 14 has one end that is fixed to and supported by the differential 22 and another end that is supported by the axle shaft bearing 110 so that the first shaft 14 is supported along its entire length.

Referring now to FIGS. 6-8, 9A, and 9B, the first gasket 26 includes a seal portion 112 and a baffle portion 114. The seal portion 112 and the baffle portion 114 may be integrally formed as a single piece from a gasket material such as sheet steel coated on both sides with elastomeric material. Alternatively, the baffle portion 114 may be formed as a discrete component and attached (e.g., bonded) to the seal portion 112. The seal portion 112 is disposed between the axial end surface 66 of the first housing component 52 and the axial end surface 86 of the second housing component 54 to create a seal therebetween. The baffle portion 114 extends inward from the seal portion 112 and cooperates with the rib 74 on the first housing component 52, the first sidewall 62 of the first housing component 52, and the axial end wall 60 of the first housing component 52 to form a channel 116.

The channel 116 guides drainage of lubricant thrown from one or more of the gears 20. The channel 116 extends along a portion of the perimeter of the first housing component 52 without extending along the entire perimeter of the first housing component 52. In the example shown, the channel 116 extends along less than one-half of the perimeter of the first housing component 52 and greater than one-quarter of the perimeter of the first housing component 52.

The channel 116 has a first open end 118 that receives lubricant thrown from one or more of the gears 20 and a second open end 120 that discharges the lubricant. While the first open end 118 is best positioned to receive lubricant thrown from the first gear 40, the first open end 118 may receive lubricant thrown from other ones of the gears 20. All sides of the channel 116 are fully closed such that lubricant flow into and out of the channel 116 is only allowed through the first and second open ends 118 and 120. As noted above, when the electric axle 10 is installed in the vehicle, the electric axle 10 may be oriented so that the second side 21 is the bottom of the electric axle 10. Thus, the first open end 118 of the channel 116 may be disposed near the bottom of the electric axle 10, and lubricant thrown from the first gear 40 and other ones of the gears 20 may flow to the first open end 118 due to the force of gravity acting on the lubricant.

The channel 116 has a first cross-sectional area at the first open end 118 and a second cross-sectional area at the second open end 120. The first cross-sectional area is greater than the second cross-sectional area. Each of the first and second cross-sectional areas may be measured within a plane that is perpendicular to both the axial end wall 60 of the first housing component 52 and the first sidewall 62 of the first housing component 52.

The cross-sectional area of the channel 116 gradually decreases from the first open end 118 to a position 122 between the first and second open ends 118 and 120 of the channel 116. In this regard, the portion of the channel 116 between the first open end 118 and the position 122 acts as a funnel for incoming lubricant. The cross-sectional area of the channel 116 remains constant (i.e., unchanged) from the position 122 in the channel 116 to the second open end 120 of the channel 116.

The baffle portion 114 of the first gasket 26 includes a sidewall 124 and a flange 126. The sidewall 124 of the baffle portion 114 projects axially from the seal portion 112 of the first gasket 26. The flange 126 of the baffle portion 114 projects inward from the sidewall 124 of the baffle portion 114.

With additional reference to FIGS. 10-14, the axial end wall 60 of the first housing component 52 forms the bottom wall of the channel 116. The flange 126 of the first gasket 26 forms the top wall of the channel 116. The rib 74 on the first housing component 52 forms the inner wall of the channel 116. The first sidewall 62 of the first housing component 52 and the sidewall 124 of the first gasket 26 collectively form the outer wall of the channel 116.

The rib 74 on the first housing component 52 contacts the flange 126 of the first gasket 26 along the entire length of the channel 116. The height of the rib 74 on the first housing component 52 and the height of the sidewall 124 of the first gasket 26 change by the same amount along the entire length of the channel 116. Similarly, the spacing between the rib 74 and the first sidewall 62 of the first housing component 52 and the extension of the flange 126 of the first gasket 26 from the sidewall 124 of the first gasket 26 change by the same amount along the entire length of the channel 116.

Figure 6:
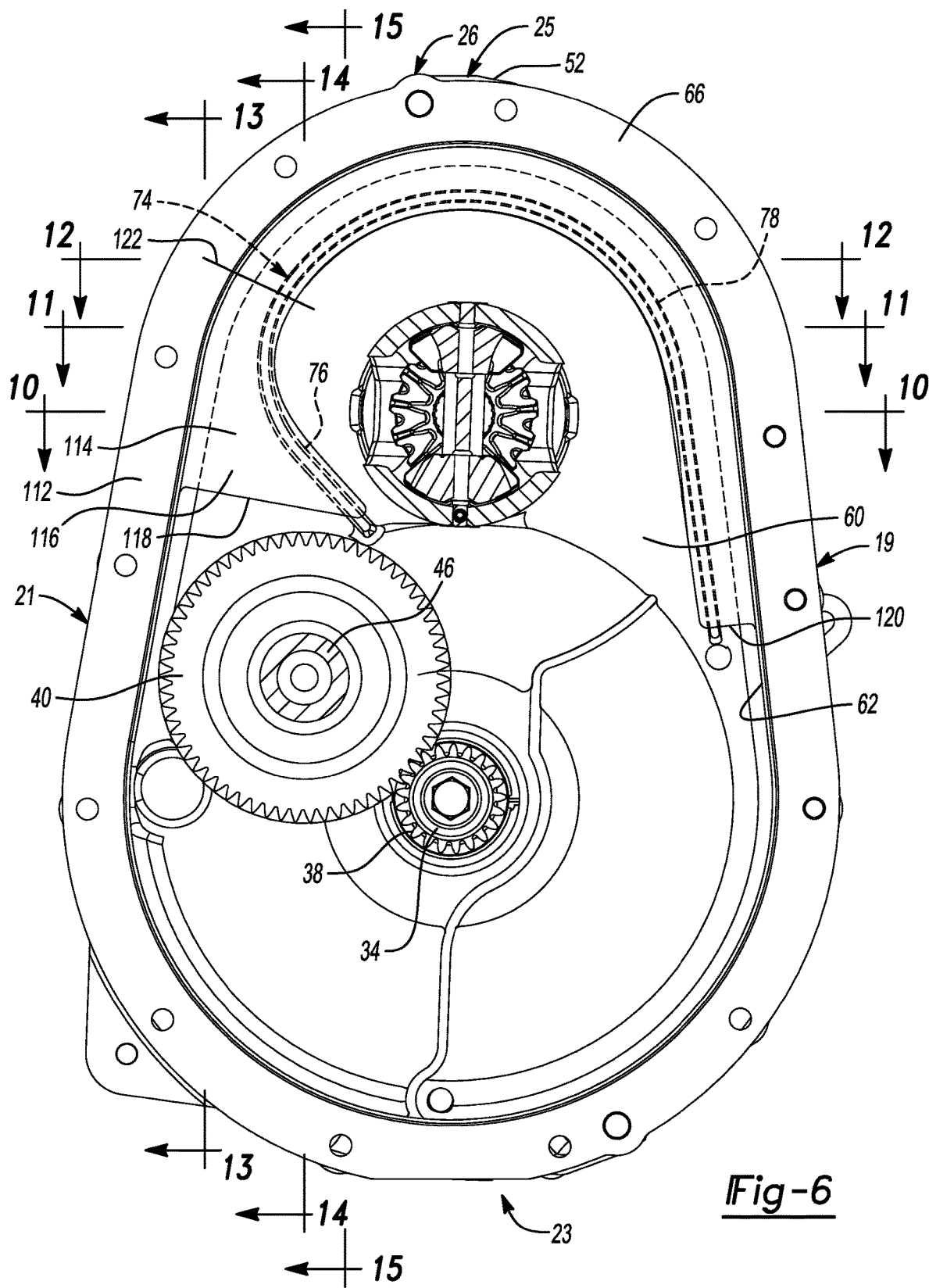
FIG. 6 is a section view of the electric axle of FIG. 1 taken along a line 6-6 shown in FIG. 5.
Figure 7:
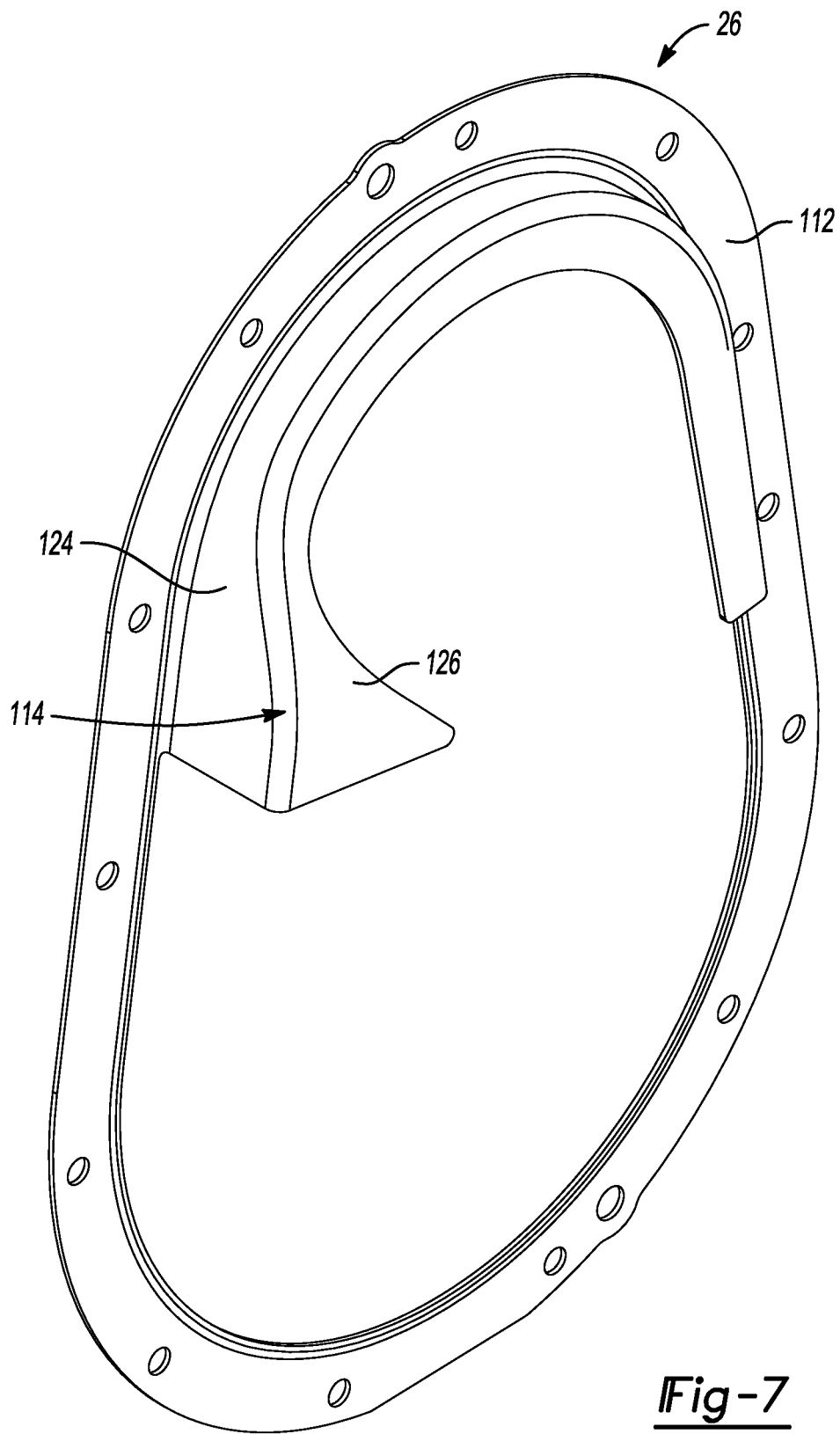
FIGS. 7 and 8 are perspective views of a gasket in the electric axle of FIG. 1.
Figure 8:
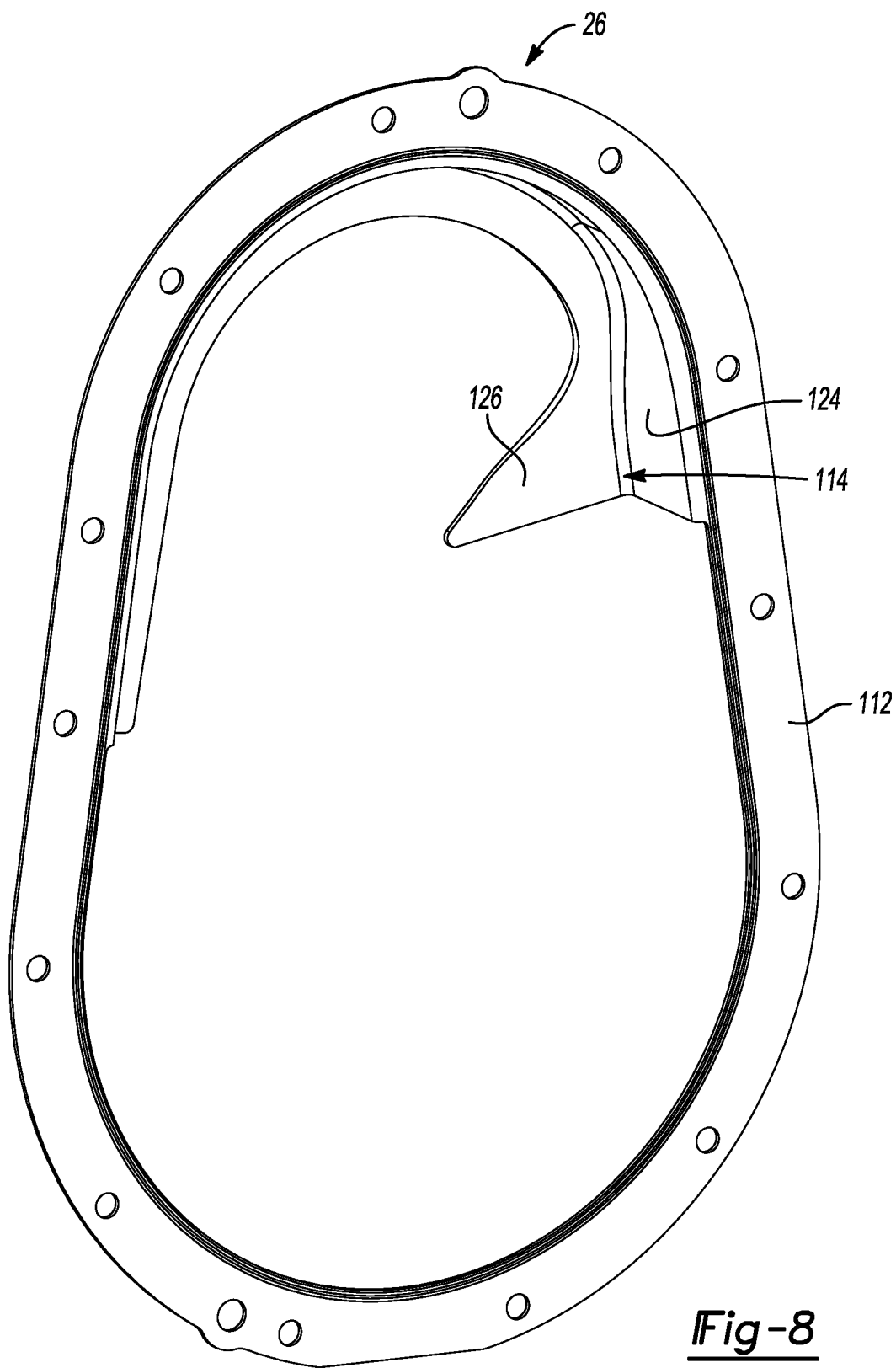
Figure 10:
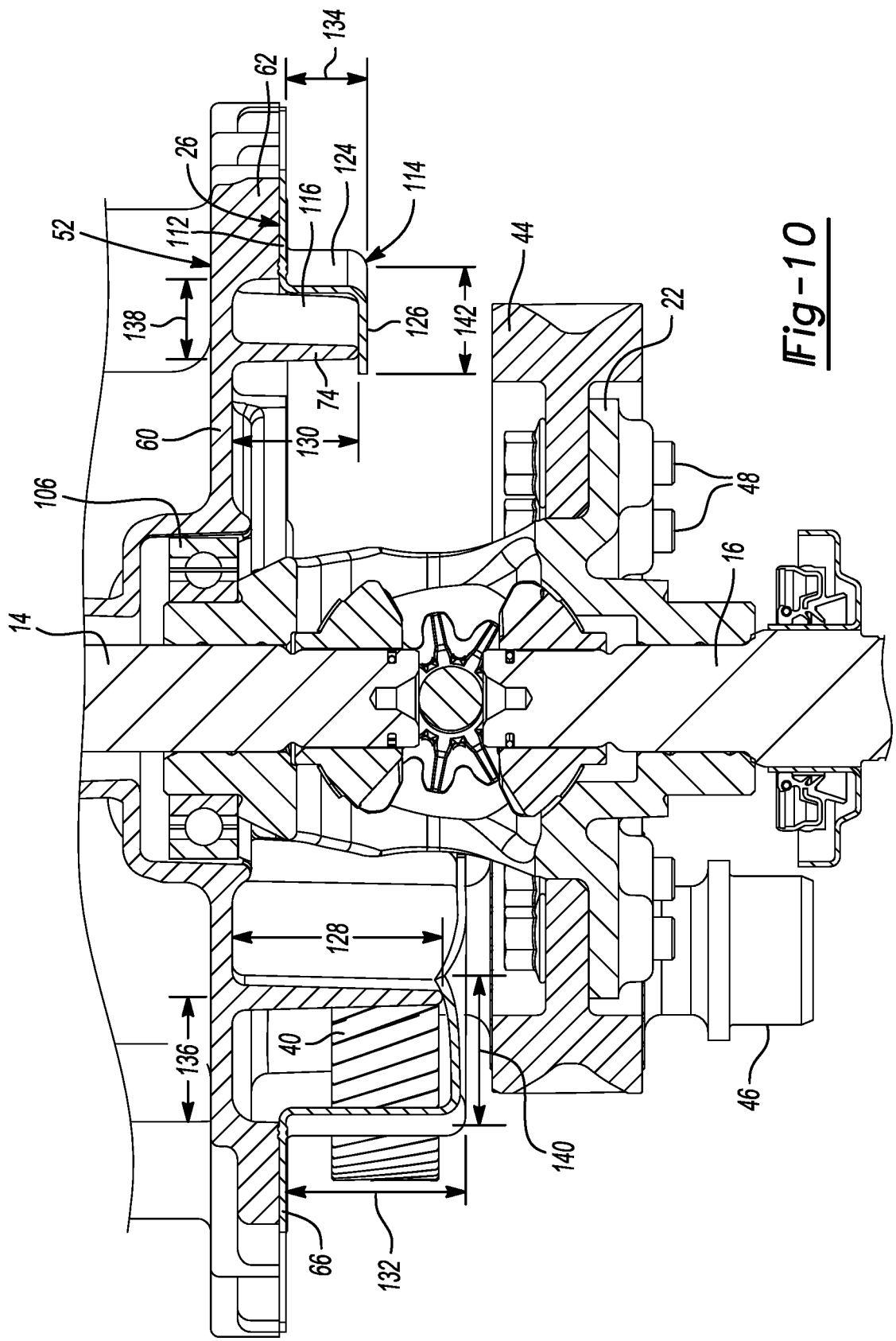
FIG. 10 is a section view of the electric axle of FIG. 1 taken along a line 10-10 shown in FIG. 6.
Figure 11:
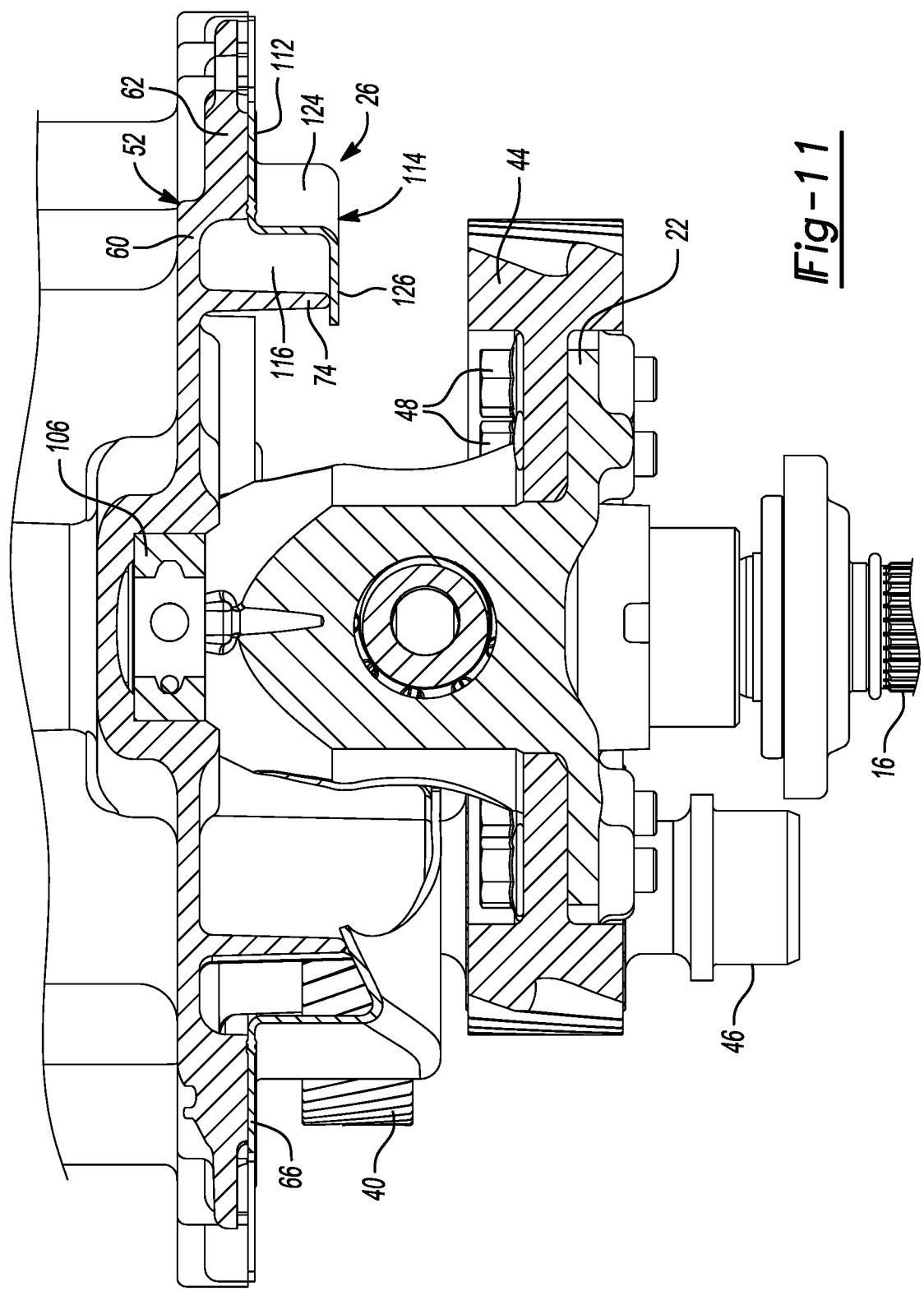
FIG. 11 is a section view of the electric axle of FIG. 1 taken along a line 11-11 shown in FIG. 6.
Figure 12:
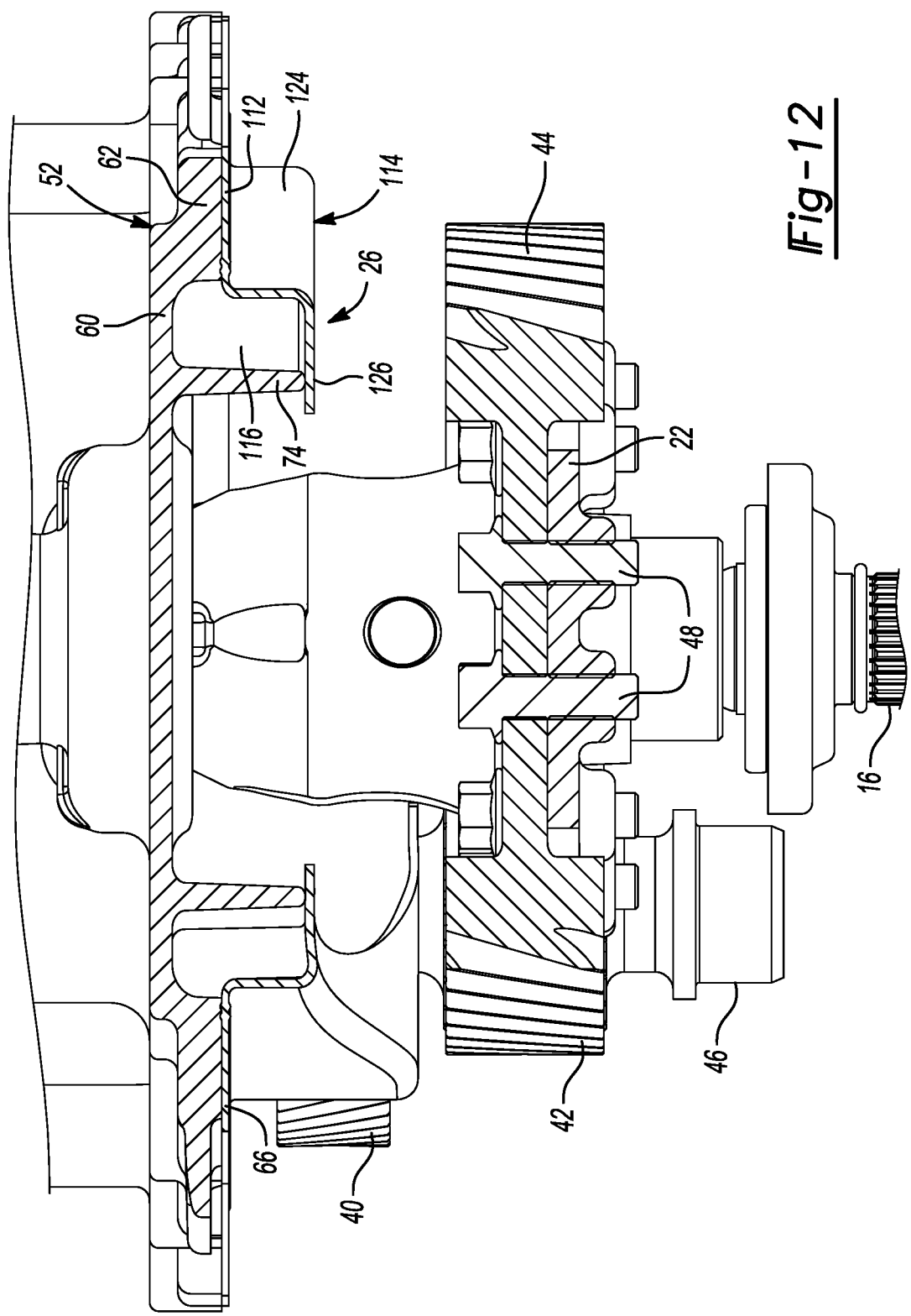
FIG. 12 is a section view of the electric axle of FIG. 1 taken along a line 12-12 shown in FIG. 6.
Figure 13:
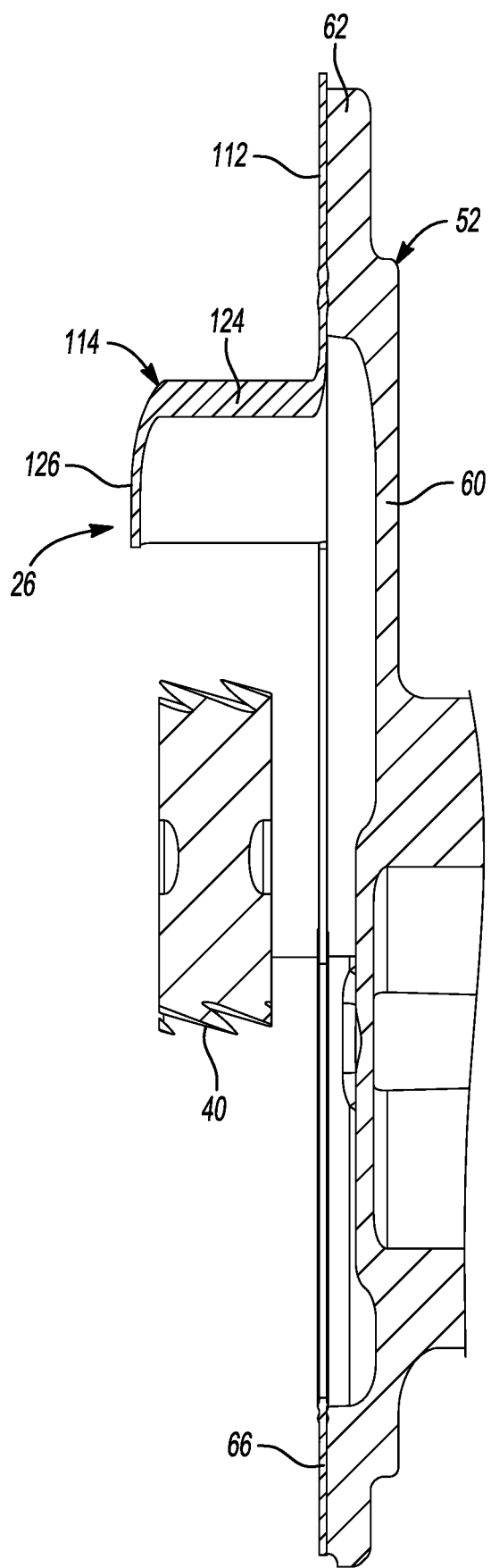
FIG. 13 is a section view of the electric axle of FIG. 1 taken along a line 13-13 shown in FIG. 6.
Figure 14:
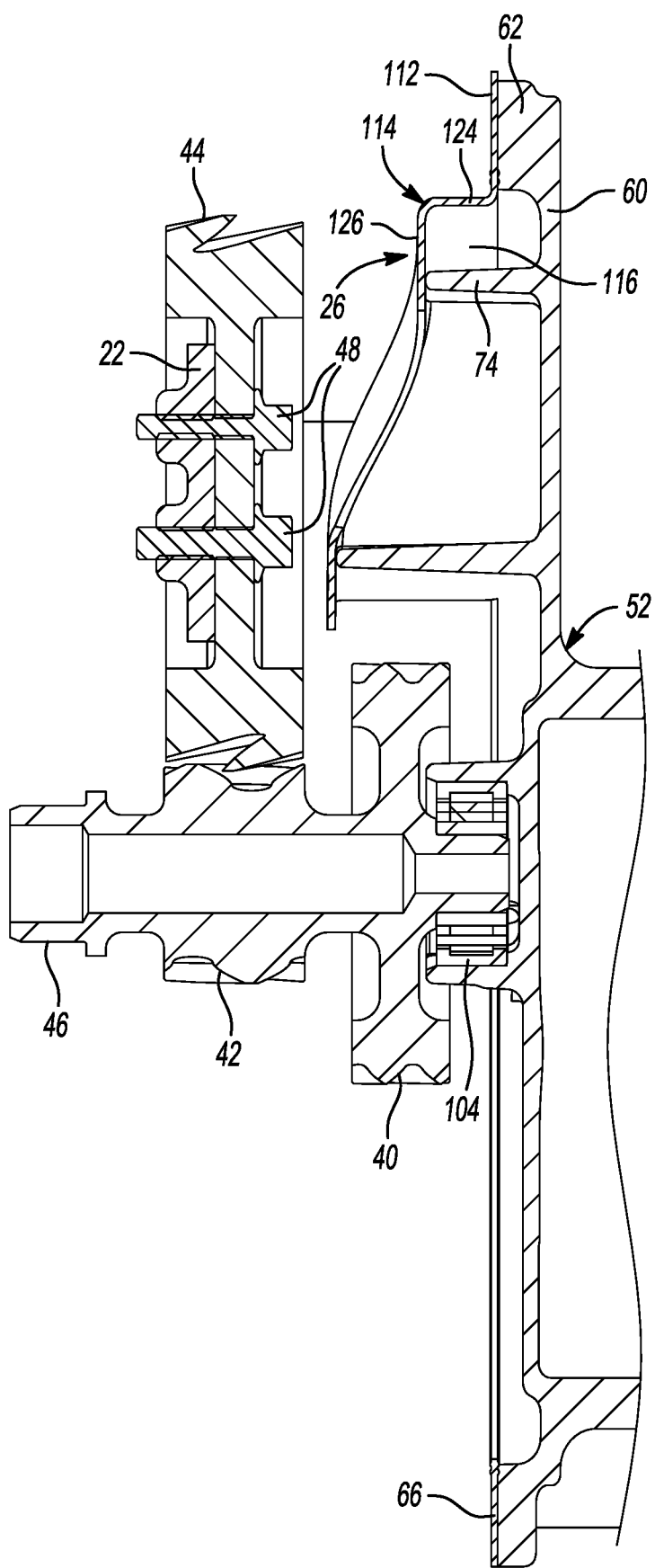
FIG. 14 is a section view of the electric axle of FIG. 1 taken along a line 14-14 shown in FIG. 6.
Figure 15:
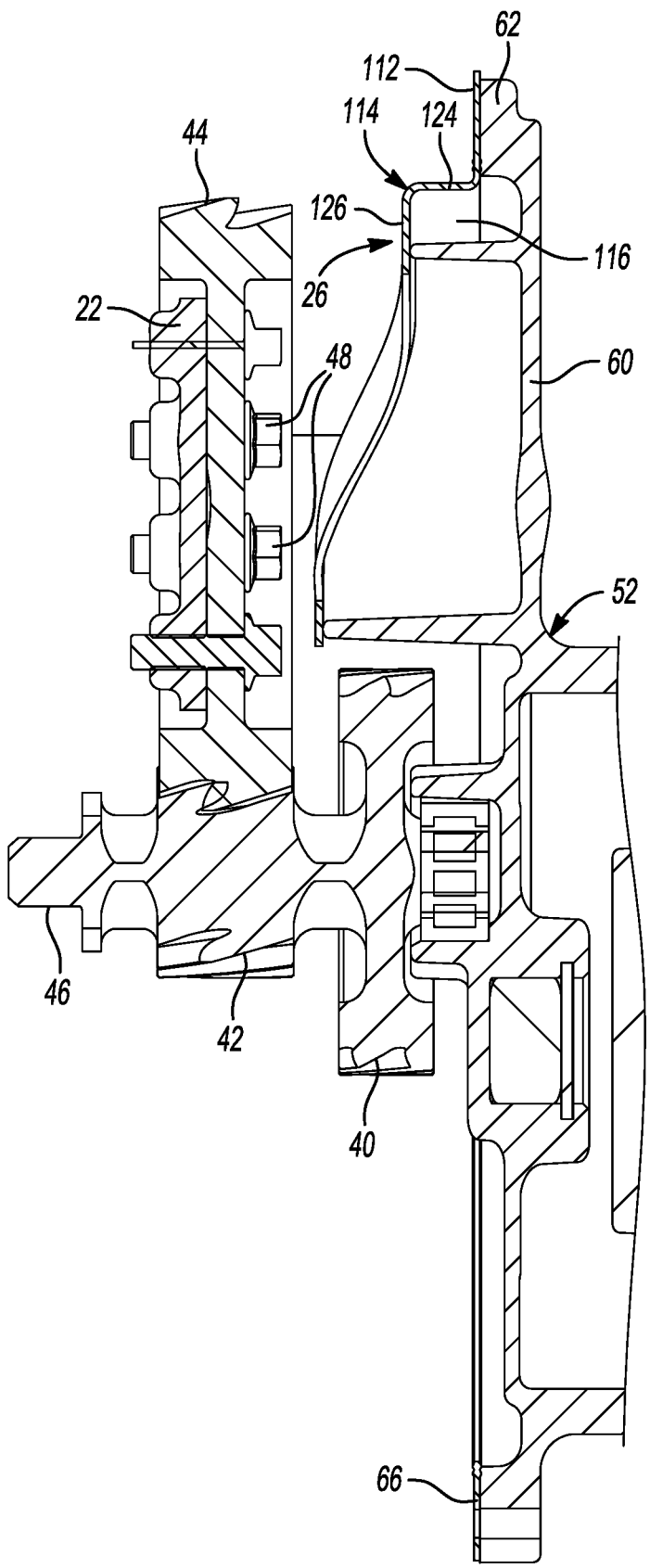
FIG. 15 is a section view of the electric axle of FIG. 1 taken along a line 15-15 shown in FIG. 6.

With particular reference to FIGS. 6 and 10, the rib 74 on the first housing component 52 projects axially from the axial end wall 60 of the first housing component 52 by a first height 128 at or near the first open end 118. The rib 74 on the first housing component 52 projects axially from the axial end wall 60 by a second height 130 at or near the second open end. The first height 128 is greater than the second height 130.

The sidewall 124 of the first gasket 26 projects axially from the seal portion 112 of the first gasket 26 by a first height 132 at the first open end 118. The sidewall 124 of the first gasket 26 projects axially from the seal portion 112 of the first gasket 26 by a second height 134 at the second open end 120. The first height 132 is greater than the second height 134. The difference between the first and second heights 128 and 130 of the rib 74 is equal to a second difference between the first and second heights 132 and 134 of the first gasket 26.

The rib 74 on the first housing component 52 is spaced inward from the first sidewall 62 of the first housing component 52 by a first distance 136 at or near the first open end 118. The rib 74 on the first housing component 52 is spaced inward from the first sidewall 62 of the first housing component 52 by a second distance 138 at or near the second open end 120. The first distance 136 is greater than the second distance 138.

The flange 126 of the first gasket 26 projects inward from the sidewall 124 of the first gasket 26 by a first amount 140 at the first open end 118. The flange 126 of the first gasket 26 projects inward from the sidewall 124 of the first gasket 26 by a second amount 142 at the second open end 120. The first amount 140 is greater than the second amount 142. The difference between the first and second distances 136 and 138 by which the rib 174 is spaced inward from the first sidewall 62 is equal to the difference between the first and second amounts 140 and 142 by which the flange 126 of the first gasket 26 projects inward from the sidewall 124 of the first gasket 26.

Figure 16:
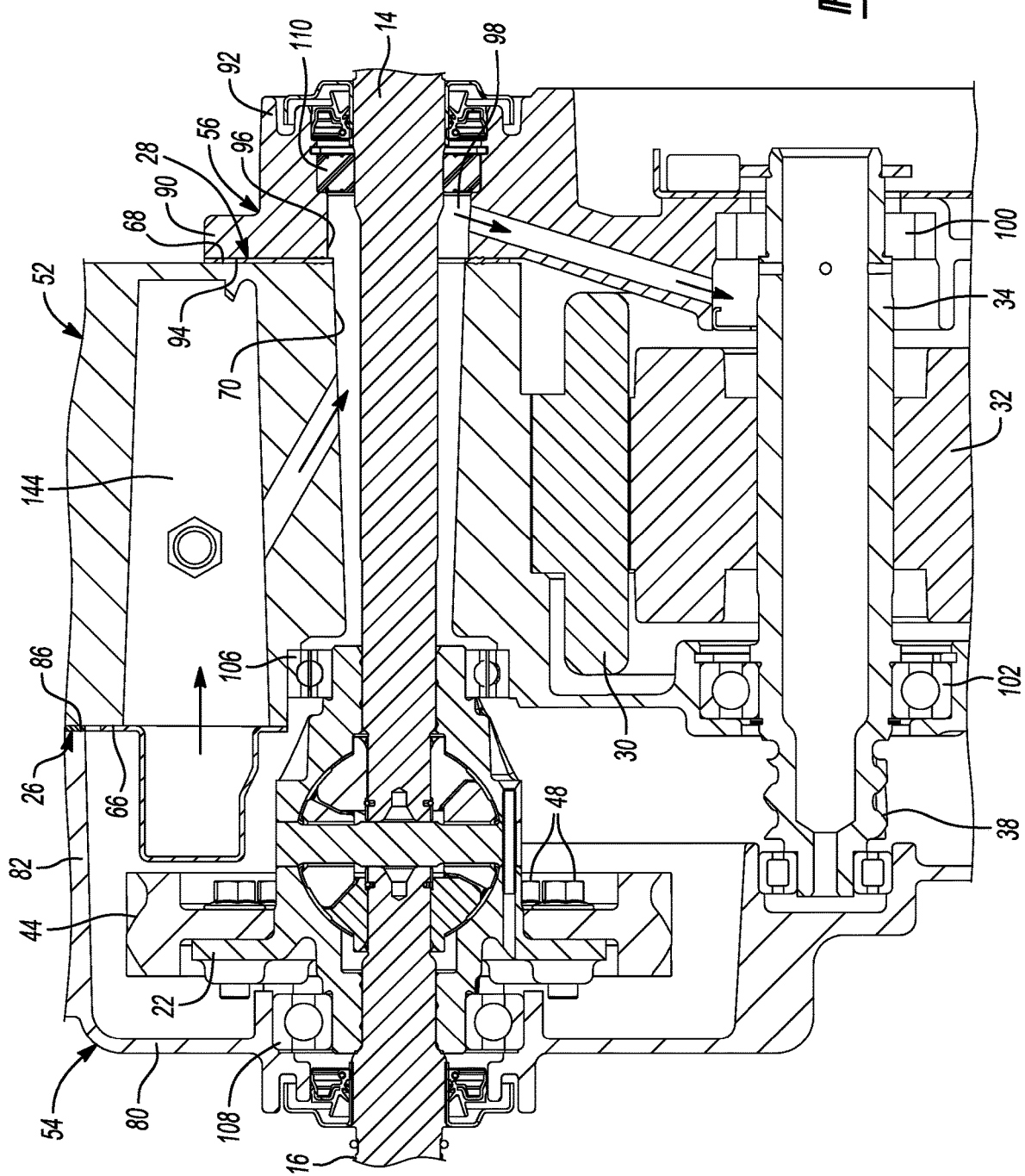
FIG. 16 is a section view of the electric axle of FIG. 1 with arrows indicating lubricant flow through the electric axle.
Figure 17:
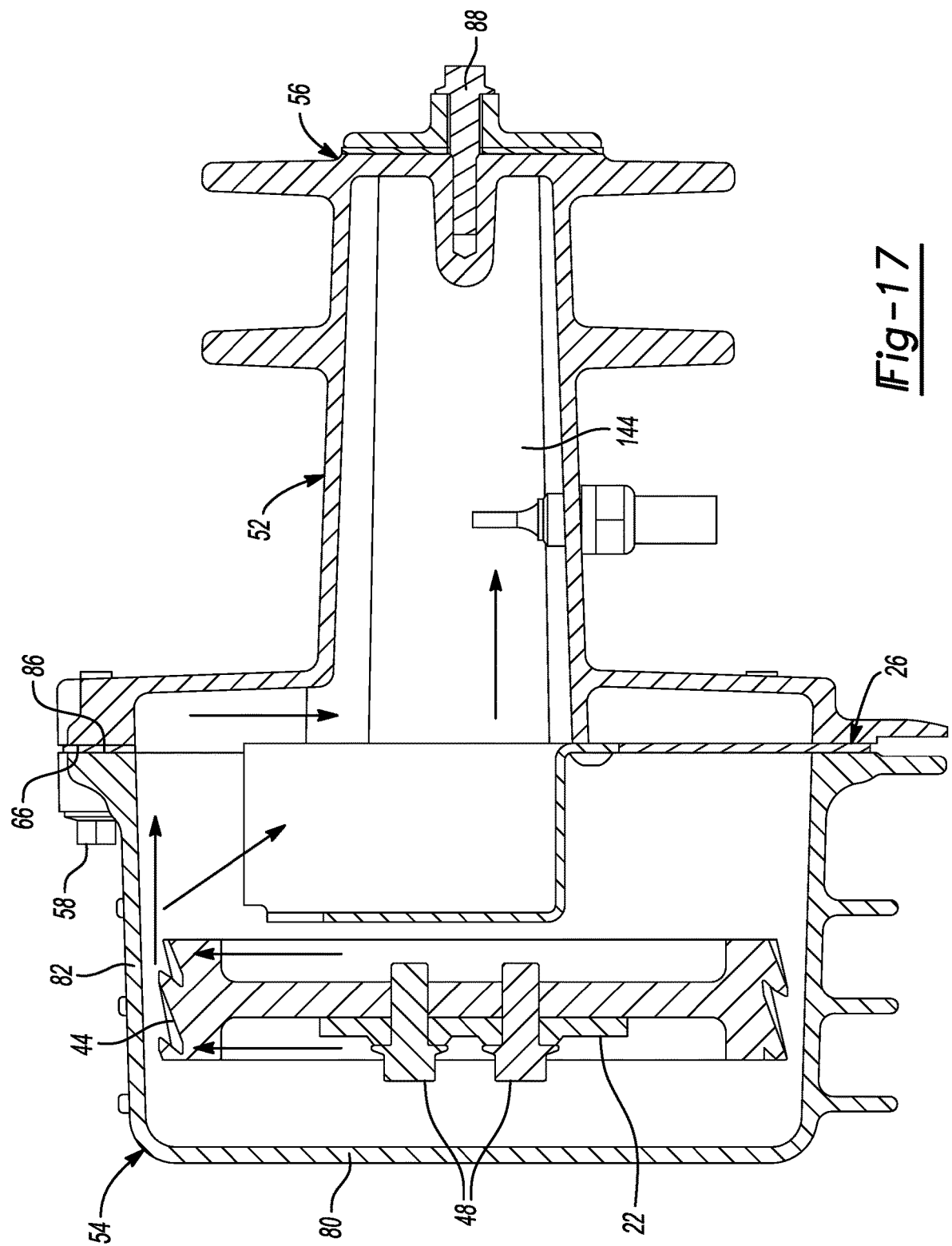
FIG. 17 is a section view of a portion of the electric axle of FIG. 1 with arrows indicating lubricant flow from a gear assembly in the electric axle to an upper sump in the electric axle.
Figure 18:
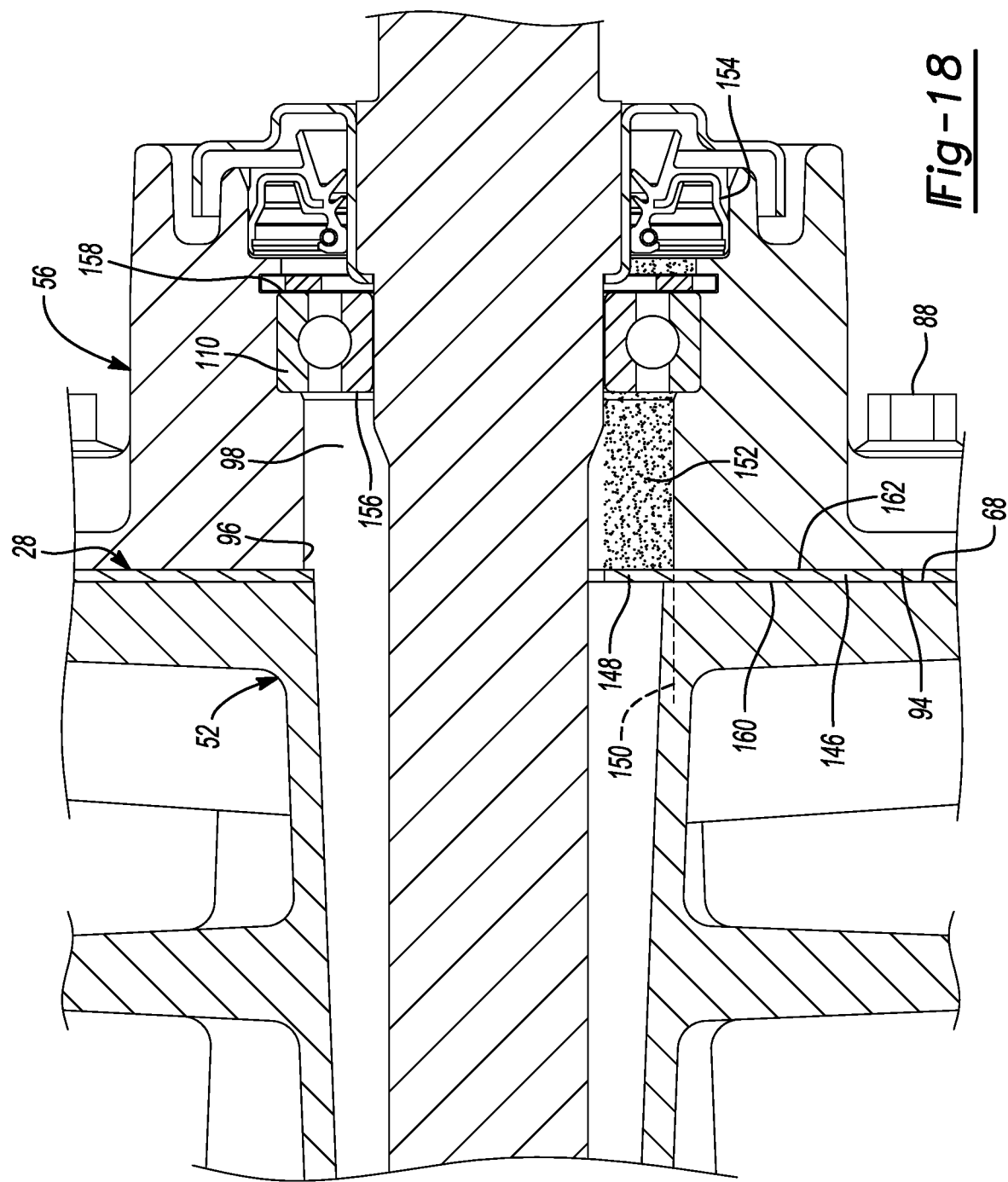
FIG. 18 is a section view of a portion of the electric axle of FIG. 1 illustrating a gasket disposed between two housing components and extending radially inward into a shaft bore to create a lubricant reservoir in the vicinity of a bearing.

Referring now to FIGS. 16-18, the channel 116 formed by the first housing component 52 and the first gasket 26 directs lubricant from the area where the gears 20 mesh together to an upper sump 144 formed by the first housing component 52. This lubricant flow is indicated by the arrows in FIG. 17. Lubricant in the upper sump 144 is distributed to other areas of the electric axle 10 where lubrication is desired. For example, as indicated by the arrows in FIG. 16, lubricant flows from the upper sump 144 to a location in the shaft bore 72 near the axle shaft bearing 110, and from that location to an area around the rotor shaft 34 adjacent to the first rotor shaft bearing 100.

With particular reference to FIG. 18, the second gasket 28 includes a seal portion 146 and a dam portion 148. The seal portion 146 of the second gasket 28 is disposed between the axial end surfaces 68, 94 of the first and third housing components 52 and 56 to create a seal therebetween. The seal portion 46 of the second gasket 28 does not extend radially inward beyond a boundary 150 of the shaft bore 98 in the third housing component 56.

The dam portion 148 extends radially inward from the seal portion 146 beyond the boundary 150 to close off at least a portion of the shaft bore 98 in the third housing component 56 and thereby create a lubricant reservoir 152 in a vicinity of the axle shaft bearing 110. The seal portion 146 may have an annular shape, and the dam portion may have a semicircular or crescent shape. The seal portion 146 and the dam portion 148 may be integrally formed as a single piece from a gasket material such as sheet steel coated on both sides with elastomeric material. Alternatively, the dam portion 148 may be formed as a discrete component and attached (e.g., bonded) to the seal portion 146.

The electric axle 10 further includes an annular seal 154 disposed in the shaft bore 98 of the third housing component 56 and forming a wall or barrier on the side of the lubricant reservoir 152 opposite of the dam portion 148 of the second gasket 28. The axle shaft bearing 110 has a first side 156 facing the first housing component 52 and a second side 158 opposite of the first side 156. The annular seal 154 is disposed on the second side 158 of the axle shaft bearing 110 and creates a seal between the first shaft 14 and the inner radial surface 96 of the third housing component 56 to prevent lubricant flow out of the electric axle 10 through the shaft bore 98. The lubricant reservoir 152 is disposed between the dam portion 148 of the second gasket 28, the annular seal 154, the first shaft 14, and the inner radial surface 96 of the third housing component 56.

The second gasket 28 has a first side 160 facing the first housing component 52 and a second side 162 opposite of the first side 160 and facing the third housing component 56. The first side 160 of the second gasket 28 abuts the axial end surface 68 of the first housing component 52 along the seal portion 146 of the second gasket 28 and the dam portion 148 of the second gasket 28. Thus, the side of the dam portion 148 opposite of the lubricant reservoir 152 is supported by the axial end surface 68 of the first housing component 52, which prevents the dam portion 148 from collapsing due to the pressure of lubricant in the lubricant reservoir 152.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A gear assembly comprising:
   a plurality of gears;
   a gear housing including a first housing component and a second housing component that are joined to one another about the plurality of gears to enclose the plurality of gears, each of the first and second housing components including an axial end wall and a sidewall projecting axially from a perimeter of the axial end wall, the sidewall of each of the first and second housing components having an axial end surface that faces the axial end surface of the other one of the first and second housing components, the first housing component including a rib that projects axially from the axial end wall of the first housing component and is spaced inward from the sidewall of the first housing component; and
   a gasket including a seal portion and a baffle portion, the seal portion being disposed between the axial end surface of the first housing component and the axial end surface of the second housing component to create a seal therebetween, the baffle portion extending inward from the seal portion and cooperating with the rib on the first housing component, the sidewall of the first housing component, and the axial end wall of the first housing component to form a channel configured guide drainage of lubricant thrown from at least one of the plurality of gears.

2. The gear assembly of claim 1 wherein the seal portion of the gasket and the baffle portion of the gasket are integrally formed as a single piece.

3. The gear assembly of claim 1 wherein the channel extends along a portion of the perimeter of the gear housing without extending along the entire perimeter of the gear housing.

4. The gear assembly of claim 1 wherein the channel has a first open end that receives the lubricant thrown from at least one of the plurality of gears and a second open end that discharges the lubricant.

5. The gear assembly of claim 4 wherein all sides of the channel are fully closed such that lubricant flow into and out of the channel is only allowed through the first and second open ends.

6. The gear assembly of claim 4 wherein the channel has a first cross-sectional area at the first open end and a second cross-sectional area at the second open end, the first cross-sectional area being greater than the second cross-sectional area.

7. The gear assembly of claim 4 wherein the baffle portion of the gasket includes a sidewall and a flange, the sidewall of the baffle portion projecting axially from the seal portion of the gasket, the flange projecting inward from the sidewall of the baffle portion.

8. The gear assembly of claim 7 wherein the rib on the first housing component forms an inner wall of the channel, and the sidewall of the first housing component and the sidewall of the gasket collectively form an outer wall of the channel.

9. The gear assembly of claim 8 wherein the rib on the first housing component contacts the flange of the gasket along the entire length of the channel.

10. The gear assembly of claim 8 wherein the sidewall of the baffle portion of the gasket projects axially from the seal portion of the gasket by a first amount at the first open end and projects axially from the seal portion of the gasket by a second amount at the second open end, the first amount being greater than the second amount.

11. The gear assembly of claim 10 wherein the rib on the first housing component projects axially from the axial end wall of the first housing component by a first height at the first open end and projects axially from the axial end wall of the first housing component by a second height at the second open end, the first height being greater than the second height.

12. The gear assembly of claim 11 wherein a first difference between the first and second heights of the rib is equal to a second difference between the first and second amounts by which the sidewall of the baffle portion of the gasket projects axially from the seal portion of the gasket.

13. The gear assembly of claim 8 wherein the flange of the baffle portion of the gasket projects inward from the sidewall of the baffle portion by a first amount at the first open end and projects inward from the sidewall of the baffle portion by a second amount at the second open end, the first amount being greater than the second amount.

14. The gear assembly of claim 13 wherein the rib on the first housing component is spaced inward from the sidewall of the first housing component by a first distance at the first open end and is spaced inward from the sidewall of the first housing component by a second distance at the second open end, the first distance being greater than the second distance.

15. The gear assembly of claim 14 wherein a first difference between the first and second distances by which the rib is spaced inward from the sidewall of the first housing component is equal to a second difference between the first and second amounts by which the flange of the baffle portion of the gasket projects inward from the sidewall of the baffle portion.

16. A vehicle driveline component comprising:
   a shaft;
   a housing including a first housing component and a second housing component, each of the first and second housing components having an axial end surface and an inner radial surface that defines a shaft bore extending axially through a corresponding one of the first and second housing components, the first and second housing components being joined to one another such that the axial end surfaces of the first and second housing components face one another and the shaft bores of the first and second housing components are at least partially aligned with one another, the shaft extending through the shaft bores of the first and second housing components;
   a bearing disposed in the shaft bore of the first housing component and directly supporting the shaft for rotation relative to the housing; and
   a gasket including a seal portion and a dam portion, the seal portion being disposed between the axial end surfaces of the first and second housing components to create a seal therebetween, the dam portion extending radially inward from the seal portion to close off at least a portion of the shaft bore in the first housing component and thereby create a lubricant reservoir that stores a lubricant in the lubricant reservoir such that the lubricant is gravity fed directly into the bearing.

17. The vehicle driveline component of claim 16 wherein the seal portion of the gasket and the dam portion of the gasket are integrally formed as a single piece.

18. The vehicle driveline component of claim 16 wherein the bearing has a first side facing the second housing component and a second side opposite of the first side, and the axle assembly further comprises an annular seal disposed in the shaft bore of the first housing component on the second side of the bearing and creating a seal between the shaft and the inner radial surface of the first housing component.

19. The vehicle driveline component of claim 18 wherein the lubricant reservoir is disposed between the dam portion of the gasket, the annular seal, the shaft, and the inner radial surface of the first housing component.

20. The vehicle driveline component of claim 16 wherein the gasket has a first side facing the first housing component and a second side opposite of the first side and facing the second housing component, the second side of the gasket abutting the axial end surface of the second housing component along the seal portion of the gasket and the dam portion of the gasket.

* * * * *